United States Patent
Kovács et al.

(10) Patent No.: US 12,556,945 B2
(45) Date of Patent: Feb. 17, 2026

(54) METHODS AND APPARATUSES FOR TESTING USER EQUIPMENT (UE) MACHINE LEARNING-ASSISTED RADIO RESOURCE MANAGEMENT (RRM) FUNCTIONALITIES

(71) Applicant: Nokia Technologies Oy, Espoo (FI)

(72) Inventors: István Zsolt Kovács, Aalborg (DK); Teemu Mikael Veijalainen, Helsinki (FI); Wolfgang Zirwas, Munich (DE); Navin Hathiramani, Coppell, TX (US); Hans Thomas Höhne, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 325 days.

(21) Appl. No.: 18/259,132

(22) PCT Filed: Mar. 2, 2021

(86) PCT No.: PCT/US2021/020368
§ 371 (c)(1),
(2) Date: Jun. 23, 2023

(87) PCT Pub. No.: WO2022/186817
PCT Pub. Date: Sep. 9, 2022

(65) Prior Publication Data
US 2024/0056836 A1 Feb. 15, 2024

(51) Int. Cl.
*H04W 24/02* (2009.01)
*H04W 8/22* (2009.01)
*H04W 24/06* (2009.01)

(52) U.S. Cl.
CPC ............ *H04W 24/02* (2013.01); *H04W 8/22* (2013.01); *H04W 24/06* (2013.01)

(58) Field of Classification Search
None
See application file for complete search history.

(56) References Cited

U.S. PATENT DOCUMENTS

| | | |
|---|---|---|
| 2014/0134965 A1 | 5/2014 | Karmi et al. |
| 2014/0269526 A1 | 9/2014 | Mitola, III |

(Continued)

FOREIGN PATENT DOCUMENTS

| | | |
|---|---|---|
| WO | 2021/063500 A1 | 4/2021 |
| WO | 2021/078373 A1 | 4/2021 |

OTHER PUBLICATIONS

"3rd Generation Partnership Project; Technical Specification Group Radio Access Network; 5GS; User Equipment (UE) conformance specification; Part 1: Common test environment (Release 16)", 3GPP TS 38.508-1, V16.3.1, Mar. 2020, 775 pages.

(Continued)

*Primary Examiner* — Saad Khawar
(74) *Attorney, Agent, or Firm* — Carter, DeLuca & Farrell LLP

(57) ABSTRACT

Systems, methods, apparatuses, and computer program products for testing user equipment (UE) machine learning-assisted radio resource management (RRM) functionalities are provided. One method may include selecting a radio resource management (RRM) functionality to be tested for a user equipment (UE) having advertised machine learning (ML)-assistance capabilities, initializing a machine learning (ML)-assistance model in the user equipment based on the advertised machine learning (ML)-assistance capabilities, generating one or more input test signals and corresponding reference output test conditions depending on the machine learning (ML)-assistance radio resource management (RRM) functionality under test, and activating UE machine learning (ML)-assistance functionality and provisioning, to (Continued)

the user equipment, a test sequence with the generated input test signals and corresponding reference output conditions.

14 Claims, 4 Drawing Sheets

(56) References Cited

U.S. PATENT DOCUMENTS

| | | | |
|---|---|---|---|
| 2017/0019454 | A1 | 1/2017 | Almohamedh |
| 2019/0104047 | A1 | 4/2019 | Tejaprakash et al. |
| 2019/0196950 | A1 | 6/2019 | Ranganathan et al. |
| 2019/0246298 | A1* | 8/2019 | Roman ................. H04W 24/08 |
| 2022/0342713 | A1* | 10/2022 | Shen ..................... G06F 9/5027 |
| 2023/0245000 | A1* | 8/2023 | Yang ........................ G06N 3/04 706/12 |

OTHER PUBLICATIONS

"3rd Generation Partnership Project; Technical Specification Group Radio Access Network; 5GS; User Equipment (UE) conformance specification; Part 2: Common Implementation Conformance Statement (ICS) proforma (Release 16)", 3GPP TS 38.508-2, V16.3.0, Mar. 2020, pp. 1-56.

"3rd Generation Partnership Project; Technical Specification Group Radio Access Network; 5GS; User Equipment (UE) conformance specification; Part 1: Protocol (Release 16)", 3GPP TS 38.523-1, V16.3.0, Mar. 2020, pp. Jan. 2098.

"3rd Generation Partnership Project; Technical Specification Group Radio Access Network; 5GS; User Equipment (UE) conformance specification; Part 2: Applicability of protocol test cases (Release 16)", 3GPP TS 38.523-2, V16.3.0, Mar. 2020, pp. 1-31.

"3rd Generation Partnership Project; Technical Specification Group Radio Access Network; 5GS; User Equipment (UE) conformance specification; Part 3: Protocol Test Suites (Release 15)", 3GPP TS 38.523-3, V15.7.0, Mar. 2020, pp. 1-229.

"3rd Generation Partnership Project; Technical Specification Group Radio Access Network; NR; User Equipment (UE) conformance specification; Radio Resource Management (RRM) (Release 16)", 3GPP TS 38.533, V16.3.0, Mar. 2020, pp. 1-1163.

"3rd Generation Partnership Project; Technical Specification Group Radio Access Network; NR; User Equipment (UE) radio transmission and reception; Part 4: Performance requirements (Release 16)", 3GPP TS 38.101-4, V16.0.0, Mar. 2020, pp. 1-268.

"TinyML: The challenges and opportunities of low-power ML applications", O'Reilly, Retrieved on Jun. 23, 2023, Webpage available at : https://www.oreilly.com/radar/tinyml-the-challenges-and-opportunities-of-low-power-ml-applications/.

"Deploy machine learning models on mobile and edge devices", TensorFlow Lite, Retrieved on Jun. 23, 2023, Webpage available at :https://www.tensorflow.org/lite.

"Open Neural Network Exchange", ONNX, Retrieved on Jun. 23, 2023, Webpage available at :https://onnx.ai/.

"A closer look at Arm's machine learning hardware", Android Authority, Retrieved on Jun. 23, 2023, Webpage available at :https://www.androidauthority.com/arm-project-trillium-842770/.

"5G+AI: The ingredients fueling tomorrow's tech innovations", Qualcomm, Retrieved on Jun. 23, 2023, Webpage available at :https://www.qualcomm.com/news/onq/2020/02/5gai-ingredients-fueling-tomorrows-tech-innovations.

Han et al., "EIE: Efficient Inference Engine on Compressed Deep Neural Network", arXiv, May 3, 2016, 12 pages.

Li et al., "Edge Intelligence: On-Demand Deep Learning Model Co-Inference with Device-Edge Synergy", arXiv, Dec. 27, 2018, pp. 1-10.

International Search Report and Written Opinion received for corresponding Patent Cooperation Treaty Application No. PCT/US2021/020368, dated May 18, 2021, 15 pages.

Extended European Search Report received for corresponding European Patent Application No. 21929369.3, dated Nov. 8, 2024, 6 pages.

Hussain et al., "Machine Learning for Resource Management in Cellular and IoT Networks: Potentials, Current Solutions, and Open Challenges", arXiv, Jul. 21, 2019, pp. 1-21.

Zhang et al., "Focused Named Entity Recognition Using Machine Learning", Proceedings of the 27th annual international ACM SIGIR conference on Research and development in information retrieval, Jul. 25-29, 2004, pp. 281-288.

\* cited by examiner

METHODS AND APPARATUSES FOR TESTING USER EQUIPMENT (UE) MACHINE LEARNING-ASSISTED RADIO RESOURCE MANAGEMENT (RRM) FUNCTIONALITIES

RELATED APPLICATION

This application was originally filed as PCT Application No. PCT/US2021/020368 on Mar. 2, 2021, which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for testing user equipment (UE) machine learning-assisted radio resource management (RRM) functionalities.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method that may include selecting a radio resource management (RRM) functionality to be tested for a user equipment (UE) having advertised machine learning (ML)-assistance capabilities, initializing a machine learning (ML)-assistance model in the user equipment based on the advertised machine learning (ML)-assistance capabilities, generating one or more input test signals and corresponding reference output test conditions depending on the machine learning (ML)-assisted radio resource management (RRM) functionality under test, and activating user equipment (UE) machine learning (ML)-assistance functionality and provisioning, to the user equipment (UE), a test sequence with the generated input test signals and corresponding reference output conditions.

Another embodiment is directed to an apparatus including at least one processor and at least one memory comprising computer program code. The at least one memory and computer program code are configured, with the at least one processor, to cause the apparatus at least to select a radio resource management (RRM) functionality to be tested for a user equipment (UE) having advertised machine learning (ML)-assistance capabilities, initialize a machine learning (ML)-assistance model in the user equipment based on the advertised machine learning (ML)-assistance capabilities, generate one or more input test signals and corresponding reference output test conditions depending on the machine learning (ML)-assisted radio resource management (RRM) functionality under test, and activate user equipment (UE) machine learning (ML)-assistance functionality and provisioning, to the user equipment (UE), a test sequence with the generated input test signals and corresponding reference output conditions.

Another embodiment is directed to an apparatus that may include means for selecting a radio resource management (RRM) functionality to be tested for a user equipment (UE) having advertised machine learning (ML)-assistance capabilities, means for initializing a machine learning (ML)-assistance model in the user equipment based on the advertised machine learning (ML)-assistance capabilities, means for generating one or more input test signals and corresponding reference output test conditions depending on the machine learning (ML)-assisted radio resource management (RRM) functionality under test, and means for activating machine learning (ML)-assistance functionality and provisioning, to the user equipment, a test sequence with the generated input test signals and corresponding reference output conditions.

Another embodiment is directed to a method, which may include downloading, at a user equipment supporting machine learning (ML)-assistance capabilities, a configuration for a machine learning (ML)-assistance model to test a machine learning (ML)-assisted radio resource management (RRM) functionality, and running a test sequence of the machine learning (ML)-assistance model using one or more input test signals and corresponding reference output test conditions that are generated based on the machine learning (ML)-assisted radio resource management (RRM) functionality under test.

Another embodiment is directed to an apparatus that may include at least one processor and at least one memory comprising computer program code. The at least one memory and computer program code are configured, with the at least one processor, to cause the apparatus at least to download, from a network node, a configuration for a machine learning (ML)-assistance model to test a machine learning (ML)-assisted radio resource management (RRM) functionality, and to run a test sequence of the machine learning (ML)-assistance model using one or more input test signals and corresponding reference output test conditions that are based on the machine learning (ML)-assisted radio resource management (RRM) functionality under test.

Another embodiment is directed to an apparatus, which may include means for downloading a configuration for a machine learning (ML)-assistance model to test a machine learning (ML)-assisted radio resource management (RRM)

functionality, and means for running a test sequence of the machine learning (ML)-assistance model using one or more input test signals and corresponding reference output test conditions that are generated based on the machine learning (ML)-assisted radio resource management (RRM) functionality under test.

BRIEF DESCRIPTION OF THE DRAWINGS

For proper understanding of example embodiments, reference should be made to the accompanying drawings, wherein.

DETAILED DESCRIPTION

Figure 1:
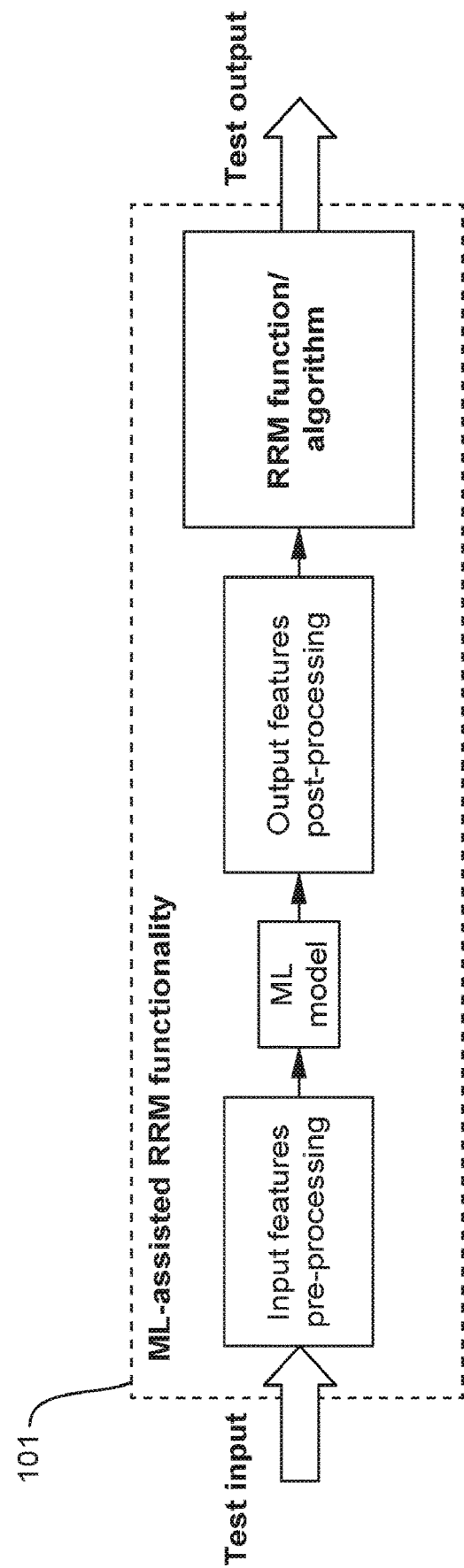
FIG. 1 illustrates a block diagram depicting an example of the scope of UE testing for a ML-assisted RRM functionality, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for testing user equipment (UE) machine learning-assisted radio resource management (RRM) functionalities, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may relate to machine learning (ML) techniques as applied to $3^{rd}$ generation partnership project (3GPP) radio access network (RAN) radio resource management (RRM) procedures and, more specifically, to a UE ML management implementation specific solution. Traditionally, ML techniques have been used in radio network management, fault detection, failure monitoring, intrusion detection, etc. Recently, there have been proposals on how to use ML techniques to implement and/or optimize RAN functions, including physical layer (PHY), medium access control (MAC) and RRM functions, such as channel encoding and/or decoding, channel estimation and/or prediction, resource allocation and/or scheduling, and mobility optimization.

In general, one proposal is to replace traditional rule-based techniques with ML-based techniques in order to achieve system gains in terms of either radio capacity (increased spectral efficiency or signaling reduction) and reliability, or complexity reduction. Moreover, it is very likely that UE chipsets will soon be able to run inference for certain RRM functions. ML-assisted layer 1 (L1) and layer 2 (L2) mechanisms are also being considered.

Recently, research has also focused on UE ML-based assistance, i.e., where the UE implements an ML host (training and/or inference). For non-radio access purposes, this is at least partially already occurring in smartphones, e.g., to optimize the keyboard functionalities, voice assistants, etc. It is, therefore, expected that RAN-related ML-based algorithms will be run on the UE side as well. As of today, completely replacing traditional rule-based RRM methods with ML-based methods is being actively researched for future generation communication systems. Another approach, with potential for short-term implementation, is to use ML-based assistance within traditional RRM methods, and where traditional RRM methods are the fallback option. This will allow the UE to take more and/or better decisions autonomously and provide more accurate and timely requests to the RAN. This also means that the traditional control and feedback signalling loops between the RAN and the UE would need to be adapted to the envisioned operating conditions of ML-based algorithms running in the RAN and/or UE.

Specified RRM functions supported by a UE should be testable. Thus, there is a need to specify how the conformance testing of such ML-assisted RRM functionalities should be performed. In addition, mobile network operators (MNOs) may also test certain UE functionalities and performance, before allowing or activating RRM functionalities or UEs/devices in their live networks.

Some example embodiments described herein may relate to the scenario in which the UE has the necessary functionalities to provide ML-based assistance to the RAN. These functionalities of the UE may include, for example, predictions or forecasts of certain events such as handover (HO), crossing reference signal received power (RSRP) thresholds, quality of service (QoS) variations, mobility state change, etc. In an embodiment, inference information obtained by these functionalities may then be reported back to the serving gNB(s) to be used as input for the RRM algorithms and RRM actions performed by the gNB(s).

A challenge that has been identified when it comes to UE conformance testing is that current 3GPP tests are designed for 'deterministic' outcomes, while RRM functionalities using ML assistance are likely to generate more probabilistic output. Furthermore, in the lab or in live networks, the performance of UEs with ML-assistance might depend not only on current radio channel conditions, but also on the 'historical' measurements and past radio conditions. This includes the assumption of constant learning of the ML models, which is different from conventional UEs with rule-based algorithms that are assumed to be fixed for the rest of the UE lifetime. Therefore, a ML model, which has passed the interoperability testing (IOT) conformance test at the beginning, might behave differently than expected after some time. Thus, specific performance test procedures need to be designed for these UE RRM functionalities using ML assistance.

As a certain challenge, it should be noted that there may be a need to test the UE behavior and not the ML instance itself alone, as the UE internal vendor specific implementation can affect any inference in some unpredictable way. Nevertheless, for both conformance and performance testing, there may also be some ML-assistance functionalities that are completely 'transparent' and the testing of those RRM functionalities can follow currently specified steps.

It is likely that, when ML-assisted RRM functionalities are initially available in certain UEs, there will be a large 'spectrum' of capabilities that need to be tested and handled in the mobile networks. For example, it is possible to envision that certain RRM functions/configurations may have strict execution timing requirements and therefore, in certain scenarios, traditional rule-based algorithms may still be used instead of ML-assisted algorithms. Also, different UEs could have different execution times (processing power, etc.), and these could also depend on how the UE specific implementation prioritizes the use of different ML-assistance algorithms.

Therefore, according to certain embodiments, some guidelines may be followed when designing UE testing procedures. As a baseline, it may be assumed that different UE ML-assistance implementation solutions for the same RRM functionality should be allowed. One or more ML models can be used by the UE implementation to provide assistance to a given/same RRM functionality. The UE testing methodology should aim to test the output/outcome of the RRM functionality that is supported or assisted by the ML algorithm running in the UE, rather than testing the ML model and algorithm implementation in itself (input/output features, hyperparameters, etc.)—which might likely be UE chipset vendor specific. The test inputs and outputs may be designed related to the RRM functionality under test and not the ML model. The UE specific implementation is responsible for executing the ML model, or the combination of several ML models, which provide input to the RRM functionality under test.

FIG. 1 illustrates a block diagram depicting an example of the scope of UE testing for one ML-assisted RRM functionality 101, according to an embodiment. The example of FIG. 1 illustrates an example of the main blocks that may be used in the testing procedure and when selecting the test input/output metrics. As illustrated in the example of FIG. 1, the functionality 101 may include a ML model that acts on pre-processed input data to produce output features. These output features may be post-processed and provided to the RRM function/algorithm, which produces the test output.

Based on these observations, there are several issues that may eventually need to be addressed when designing a full test framework for UE RRM functionalities using one form or another of UE ML assistance. For example, this may include how to test the UE ML-assisted RRM functionality without explicitly testing of a particular ML model implementation (vendor specific or not) and with minimal or no information about the ML model implementation. In addition, it may need to be determined how or if to accommodate different possible ML architecture options (e.g., reinforcement learning (RL), supervised learning (SL), unsupervised learning (USL), etc.) for a given RRM functionality, whether other UE radio capabilities need to be considered, how and if to specify this ML-assistance test framework, how to design a more common test framework for conformance testing and real-time performance testing (over the air), and how to distinguish if a UE's output was rule based or ML based.

Figure 2:
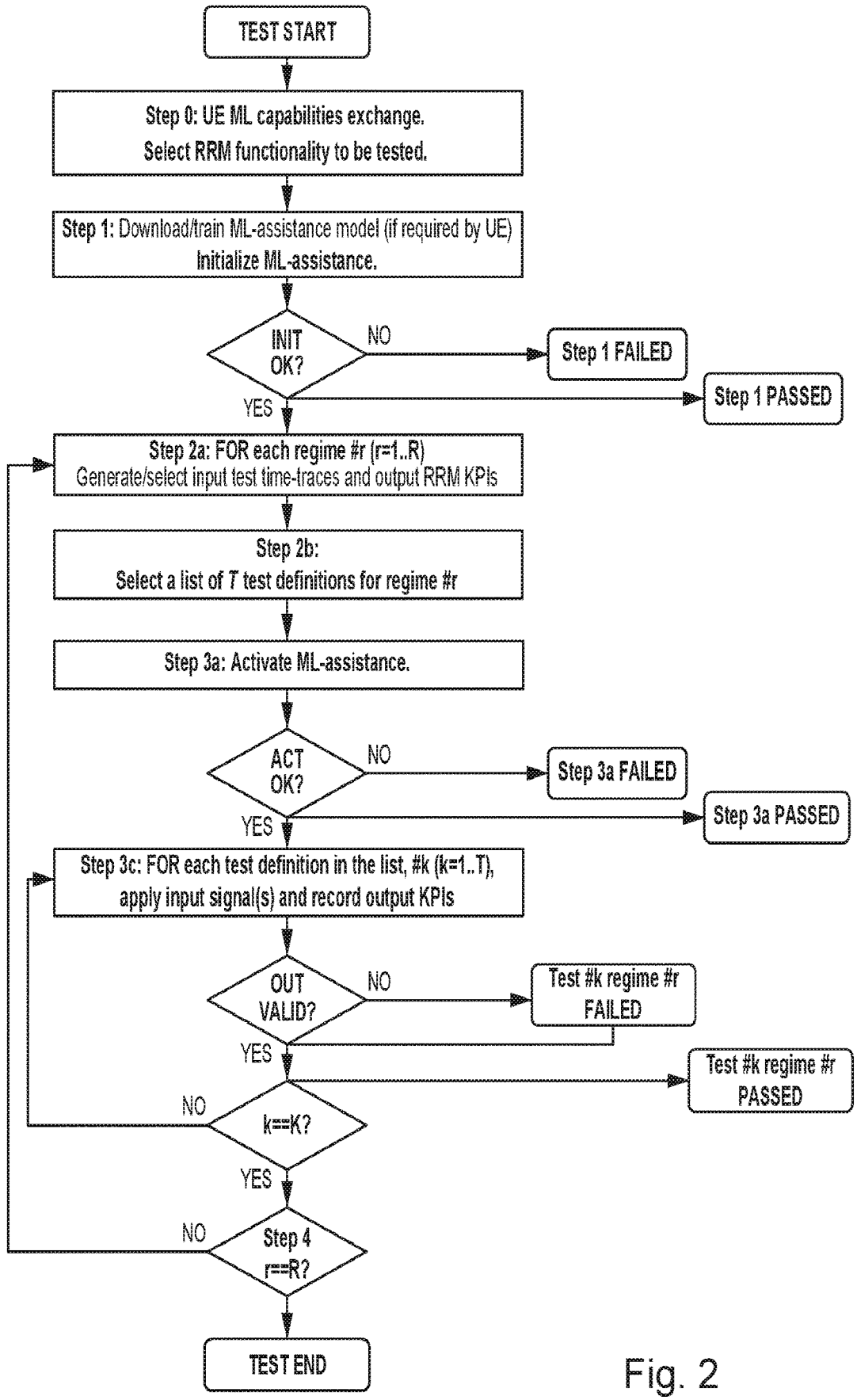
FIG. 2 illustrates an example flow diagram of a method, according to an embodiment.

As will be discussed in the following, certain embodiments may include a conformance testing process. FIG. 2 illustrates an example flow diagram of a conformance testing method for ML-assisted RRM functionality, according to one example embodiment. As illustrated in the example of FIG. 2, at step 0, the method may include selecting the RRM functionality to be tested for a UE having advertised ML-assistance capabilities. In this respect, UE capabilities may be used and/or signaling and testing interfaces specified for this purpose may be used.

According to certain embodiments, at step 1, the method may include selecting a ML-assistance method to download, and configuring and/or initializing the ML-assistance model in the UE under test, depending on the advertised/exposed UE ML-assistance capability. Signaling interfaces specified for this ML purpose may be used, which are not specific to testing procedures. For example, if a UE has ML inference only capability, then the full model may be downloaded or the exposed model may be activated. However, if a UE has ML training and inference capability (the steps and parameters for this procedure can be advertised by the UE when exposing its ML capabilities), then model parameters (initialization, hyperparameters, etc.) may be downloaded in the required format, or the training mode for the exposed ML model is activated and the required training sequence is run. If initialization status feedback is advertised/supported by the UE, then an embodiment may be configured to wait for feedback from the UE indicating ML-related initialization status. In case of ML training support by the UE, there may be a feedback indication from the UE when the training/convergence sequence has finished. This could also be valid when reinforcement learning techniques are used, and when the algorithm has to converge or stabilize. In an embodiment, as illustrated in the example of FIG. 2, if initialization fails, then the ML-assistance test may be terminated with a status indicating that initializing the ML model in UE has failed. Otherwise, initialization may be declared as passed and the process may proceed to the next procedure at step 2a.

As further illustrated in the example of FIG. 2, the method may include, at step 2a, generating and/or selecting input test signal(s) and corresponding reference output key performance indicators (KPIs) depending upon the ML-assisted RRM functionality under test. For example, the general categorization of input and output types when ML is applied in combination with existing RRM functionalities may be used. These general input types may include: one-time 1-D/2-D/3-D radio measurements (e.g., time-frequency-space channel), one or more time-traces of radio measurements (e.g., RSRP, locations), and/or one or more time-traces of events (e.g., HO or DC conditions). The general output types may include: one-time inferred labels & probabilities (e.g., 97% probability for 'good CQI' in next TTI), one-time inferred action (e.g., antenna panel switch in next TTI), sequence of inferred events or 1D/2D data samples (e.g., RSRP time-trace for next 500 ms), and/or sequence of inferred actions (e.g., beam tracking direction for next 500 ms).

As shown in the example of FIG. 2, at step 2b, the procedure may provide a list of T test definitions (inputs and outputs) that may be used iteratively, as discussed below. The multiple tests in this list are intended to emulate realistic input and output behavior for a given operating regime (e.g., statistically stationary or non-stationary) radio condition for the UE. Optionally, in an embodiment, steps 2a and 2b can be repeated for R different testing regimes, i.e., under different 'stationary' radio conditions. For each regime, or optionally for each test definition, a relevant RRM traffic model may be enabled, which simulates UE resource scaling to be accounted for when ML-assisted RRM. Test input generation may include a known "exploration" or "golden" signal time-trace sequence which have pre-validated output RRM performance KPI (validation data). An embodiment may use randomized, but controlled modifications, of the input data to avoid potential ML model overfitting or simple software emulation and 'fake ML' outputs in the UE, e.g., to introduce varying noise or distortion in the input sequences and/or to introduce varying delay and/or interruptions in the input sequence. According to an embodiment, test reference output may include: a probability density function of the measured KPIs, e.g., Time To Trigger, rate of antenna panel switch, etc.; event categorization/labels, e.g., 'Too early HO', 'HO ping pongs', 'Late HO'; actions categorization/labels, e.g., antenna panel #X switch on/off, neighbor cell/beam detection on/off, P3 procedure activation on/off, etc.; time-sequence of predicted KPIs, e.g. RSRP, CSI/CQI, etc. The output metrics may be combined with explicit delay requirements for providing an answer or feedback from the terminal/UE. This can be further linked to the used varying delay and/or interruptions in the input sequence.

Certain embodiments may provide several options for generating a testing regime. In one embodiment, an option to generate a testing regime may include, for a given RRM functionality, using a time-series of input conditions (metric values relevant for the functionality) which are statistically stationary (e.g., mean, variance, autocorrelation, are all constant) over time sequence. Then, different testing regimes can be generated by changing one of the statistical parameters (e.g., mean or variance) of the time sequence. This 'stationary' regime definition may be suitable for conformance testing purposes, because the output is in general easier to interpret and test against a reference. According to a further embodiment, another way to generate a testing regime is to include a specific shift (change rate) versus time step of one of the statistical parameters (e.g., mean or variance) during the generated time sequence. This 'non-stationary' regime definition may be useful in performance testing because it can better emulate the real-life operating conditions of the UE.

According to certain embodiments, the test definitions, within a given testing regime, may be generated such that all test inputs have the statistical characteristics imposed by the regime definition. The corresponding expected output (or range of outputs) is the same for all tests within the list k=1 . . . T under the same testing regime.

As further illustrated in the example of FIG. 2, the method may include, at step 3a, activating ML-assistance and running test sequence/loop with varying input and output conditions as selected/generated in step 2. If ML-assistance activation is advertised or supported by the UE, then the method may include sending an activation or trigger signal to the UE (RRC, MAC or DCI) and awaiting feedback from the UE indicating its ML-assistance activation status. If activation fails, then the ML-assistance test may be terminated with status of step 3a failed. Otherwise, step 3a is passed and the method may include running a test loop of the selected ML-assisted RRM functionality using the input and output lists selected or generated in step 2, such as select regime #r (r=1 . . . R). For each test definition in the list, #k (k=1 . . . T), at step 3c, the method may include applying input signal(s) and recording output KPIs. For example, this may include sending and/or applying test input to the UE and waiting for UE output feedback. If no UE output is received within the expected time period or delay, then it may be declared that step 3 test #k failed (or timeout). Otherwise, the validity of the UE output may be checked against the corresponding test reference output. If the validity check fails, then it may be declared that step 3 test #k regime #r failed (or is invalid). If the validity check is confirmed, then it may be declared that step 3 test #k regime #r passed. It is noted that the validity check may also take into account that ML models might improve their inferences over time and might, for example, delay a handover (HO) and thereby avoiding a ping pong effect. In that sense, the test data may define a minimum requirement regarding the final RRM issue and leave room for improvements.

In the example of FIG. 2, at step 4, the method may return to step 2 until a certain number of testing regimes are completed. This 'outer-loop' may be required when the RRM functionality under test has to be able to accommodate different input operating regimes.

In a controlled environment, the performance testing (over-the-air or cable) can follow similar general steps to those described above for the conformance testing. According to certain embodiments, however, for the performance testing, in the output validation of step 3, instead of just comparing to a test reference output (pre-defined range of KPI values), every output is also recorded versus the T test definitions used in step 3 and the R different regime conditions selected in step 2. In addition, for certain RRM functionalities, such as HO, even the "failed" output may be recorded for completeness and the testing should not be terminated. For performance testing purposes, the number R of different regimes and T test definitions can be significantly increased, depending also on the RRM functionality under test. When available and supported by the UE, a non-ML 'baseline' performance may also be recorded with ML-assistance disabled.

Over-the-air and in live networks, the performance testing with generated inputs is not always possible; thus, real-life inputs can be used. Recording and assessing the output may be performed as described above. For signaling reduction purposes, the input data as well as the output may be recorded on the UE or its attached test equipment, and potentially uploaded to the network periodically or at later stage, such as in MDT. The UE ML-assisted RRM functions that are reported could, for example, additionally include: time window where UE-assisted RRM function was active, instances in which the UE-assisted RRM function was active and employed by the UE, instances in which the UE-assisted RRM function was active and not employed by the UE, information on whether the UE-assisted RRM function was employed within a certain number of seconds of a failure.

As described above, FIG. 2 is provided as one example. Other examples are possible according to some embodiments.

As another example, for the over-the-air testing it may be relevant to know and control the real live inputs as accurately as possible as it will be received at the UEs. Therefore, in some embodiments, the gNB or the network may provide assistance by indicating to the UEs suitable test conditions based on knowledge of the environment as well as the UE locations.

In a further example embodiment, a fully controlled conformance test may be performed based on the available hardware model of a certain UE and then the hyperparameters from a newly trained ML model can be uploaded. In this way, a full set of standard tests can be run and especially the behaviour in rare events can be validated in the form of ML model instance certificate added to the UE capabilities. The UE ML capabilities can be exchanged.

Some examples of conformance testing cases are discussed in the following for further clarity. In one example, a conformance test may be specified to evaluate the UE ML-assistance for handover (HO). In this example, it may be assumed that the UE ML-assistance is applied to optimize the time-to-trigger parameter of a specific HO event, e.g., A3. When enabled by the network, the UE ML-assistance permits the UE to deviate from the default time-to-trigger value provided by the network in an attempt to reduce end user interruptions and improve overall mobility performance.

The test setup may include that the UE supports time-to-trigger ML assistance, the serving and neighbour cell allow for UE assisted ML for A3 time-to-trigger, and A3 handovers are enabled between cells of test setup. As test inputs, the serving cell includes a default A3 time-to-trigger (e.g., during RRC reconfiguration). Additionally, other A3 event handover parameters may be statically configured for the test (i.e., threshold, hysteresis, etc.), and signal vectors may be generated with the RSRP/RSRQ signal variation of both cells involved in the test case, i.e. slow/fast fading with different fading depths and durations.

For ML-assisted performance test execution, the following steps may be executed: (1) UE enters connected mode, (2) a data session with a specified QoS and traffic profiles is initiated, (3) serving cell enables UE ML-assisted time-to-trigger, (4) RSRP/RSRQ signal strength variation for cell A and B is initiated as per configured patterns, (5) allow for HOs between both cells of the test setup and test duration could be, e.g., 10 min, and (6) optionally repeat the test with different default values of time-to-trigger or different RSRP/RSRQ signal variation patterns.

For baseline performance test execution, the following steps might be executed: (1) UE enters connected mode, (2) a data session with the specified QoS and traffic profiles is initiated, (3) serving cell does not enable UE ML-assisted time-to-trigger, (4) RSRP/RSRQ signal strength variation for cell A and B is initiated as per configured patterns, (5) allow for HOs between both cells of the test setup and test duration could be, e.g., 10 min, and (6) repeat the test with other parameterizations or inputs considered for the ML-assisted performance tests.

According to certain embodiments, outputs or metrics for each test performed (applies for both ML-Assisted and Baseline Performance tests) may include a probability density function of the measured time-to-trigger for UE measurement report, a categorization of HOs as 'too early HO' (HO ping pongs) or 'late HO' (HO failure, e.g., leading to re-establishment), or a measure of HO success rate (HOSSR). The probability density function of the measured time-to-trigger for UE measurement report allows for evaluation of whether the UE ML-assistance was actually employed. It could be that, due to input signals generated, the default parameter set was optimal or that due to other conditions, e.g., UE limited processing capabilities, the UE employed rule based algorithms instead of ML-assistance.

In an embodiment, for every UE ML-assisted test, an output metric A may be evaluated. As one example, a success criteria may be that the percentage of samples outside the range of the rule based PDF should be larger than 50%. If this criteria is not fulfilled, this test run may be discarded. It is noted the corresponding Baseline test case may also be discarded. A main difference between conformance and performance testing, is in the output validation (step 3), where instead of just comparing to a test reference output (pre-defined range of KPI values), every output is also recorded versus the T test definitions used in step 3 and the R different regime conditions selected in Step 2. Another difference is that for certain RRM functionalities, such as HO, even the "failed" output are to be recorded for completeness and the testing should not be terminated. For performance testing purposes, the number R of different regimes and T test definitions can be significantly increased, depending also on the RRM functionality under test.

One example of when the conformance UE ML-assisted test may be declared successful, is if the following criteria are met. A first criteria may include, for all valid test runs, to compare the sum of all the 'too early HOs' and 'late HO' of UE ML-assisted tests and baseline conformance tests. In this example, the difference between the two tests should be within $-L\%$ and $+M\%$ (e.g. $-5\%$ and $+20\%$). The exact limits of the acceptable performance could depend on the stationarity regime used. The acceptable degradation ($-L\%$) should be minimal and smaller than the expected gain ($+M\%$). This is the case because ML-assisted HO solutions are expected to improve the HOSSR performance, or the performance degradation is minimal and the actual gain from using ML-assistance are observable at higher layers only. Another criteria may include HOSSR from ML based UE is within $-D\%$ and $+G\%$ of the value provided from rule based testing. The exact limits of the acceptable performance could depend on the stationarity regime used, and having the same considerations for the limits $-D\%$ and $+G\%$ apply as for the first criteria. A further criteria may be that at least 70% of the ML-assisted test runs were successful.

In another example, a conformance test may be specified to evaluate the UE ML-assistance for link adaptation (LA). According to this example, a UE's LA ML-assistance model may be downloaded or configured in the UE (depending on the UE exposed capabilities) and the ML-assistance is initialized. It may be assumed that that one or more scenario-specific ML-assistance models may be in use and be initialized in this step.

Then, the test data sets may be generated and/or selected. Input data may include time-traces of radio signals applied to one or more antenna ports of the UE; input configuration may also include the usual scheduling parameters, such as radio resources on which transmission shall happen, and amount of data to be transmitted; input configuration may also include the optimization target for the ML for LA, such spectral efficiency or percent of transport blocks below a certain packet error probability (PEP)—a UE may be able to report the achievable PEP, or other QoS parameters such as delay that can be affected by LA. The test time-trace set may span a period of several seconds, corresponding to the UE traversing an environment at a given speed, e.g., one or more regimes, each with several test definitions (if needed). The test time-trace may also be long enough to allow a learning-enabled model to evolve its neural network and adapt (depending on the UE exposed capabilities).

The LA ML-assistance may be activated in the UE (the UE applies the input test data to its ML-assisted LA). The UE is provided with the selected input test data signals. The application may occur in real-time according to the time scale of the test data or faster than real-time. The UE may provide the generated output data to the network. The network may then decide on whether conformance tests have been passed, based on LA determined modulation and coding scheme (MCS), or achieved PEP for packets, or other QoS parameters such as delay, and time for the UE to deliver the result.

Figure 3:
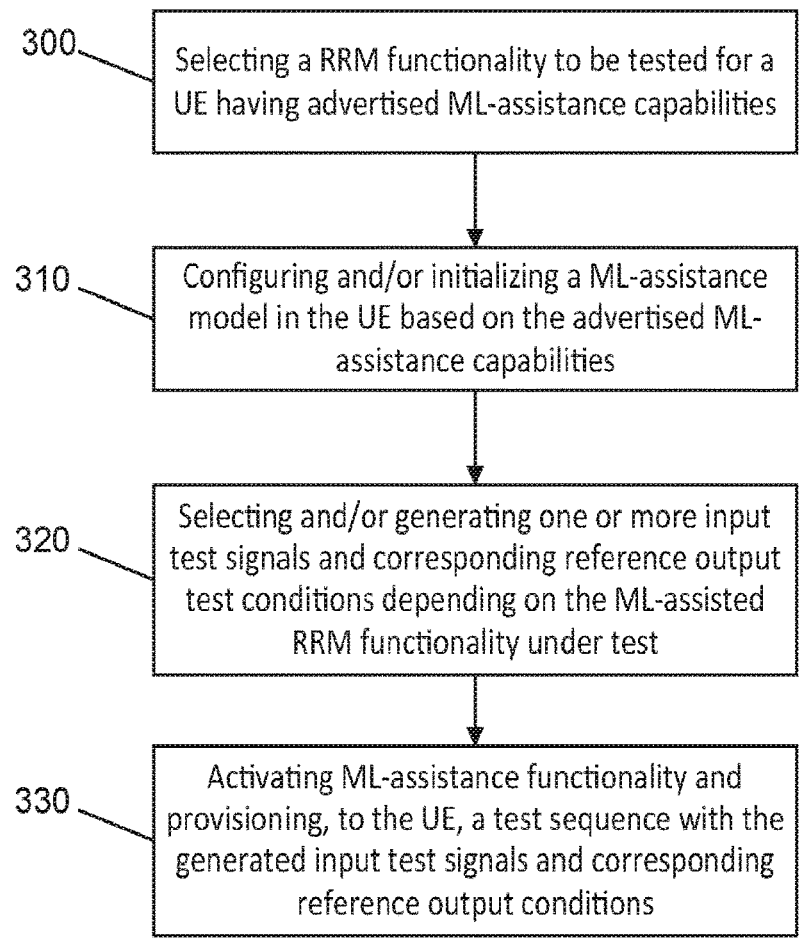
FIG. 3 illustrates an example flow diagram of a method, according to an embodiment.

FIG. 3 illustrates an example flow diagram of a method for testing UE ML-assisted RRM functionalities, according to one embodiment. In certain example embodiments, the flow diagram of FIG. 3 may be performed by a network entity or network node in a communications system, such as LTE or 5G NR. In some example embodiments, the network entity performing the method of FIG. 3 may include or be included in a base station, access node, node B, eNB, gNB, NG-RAN node, transmission-reception points (TRPs), high altitude platform stations (HAPS), relay station or the like. As such, some of the operations illustrated in FIG. 3 may be similar to some operations shown in, and described with respect to, FIG. 2.

As illustrated in the example of FIG. 3, the method may include, at 300, selecting a RRM functionality to be tested for a UE having advertised ML-assistance capabilities. In some embodiments, the RRM functionality to be tested may be selected using UE capabilities, or using signaling and testing interfaces specified for this purpose. The method may include, at 310, configuring and/or initializing a ML-assistance model in the UE based on the advertised ML-assistance capabilities. In one embodiment, when the UE has ML training and inference capability, the initializing 310 may include providing, to the UE, at least one parameter for the ML-assistance model. According to an embodiment, when the UE has only ML inference capability, the initializing 310 may include providing, to the UE, the full ML-assistance model. In an embodiment, when the UE supports initialization status feedback, the initializing 310 may include waiting to receive feedback from the UE indicating its ML-assistance model initialization status.

As further illustrated in the example of FIG. 3, the method may include, at 320, selecting and/or generating one or more input test signals and corresponding reference output test conditions depending on the ML-assisted RRM functionality under test. According to some examples, the input test signals may include batch signals, well-defined sequences, and/or a pre-defined method to generate random test signals with a certain probability distribution. In one example, the reference output conditions may include KPIs. According to an embodiment, the generating 320 may include providing a list of test definitions that include inputs and outputs to be used iteratively when running the test sequence. In one embodiment, the generating 320 of the input test signals may include generating a signal time-trace sequence having pre-validated output RRM KPIs. According to certain embodiments, the generating 320 of the output test conditions may include generating one or more of: probability density functions of measured KPIs, event categorization, actions categorization, time-sequence of predicted KPIs, and/or output metrics combined with delay requirements for receiving feedback from the UE. According to some embodiments, if needed, the generating 320 of the input test signals and corresponding reference output conditions may be repeated for different operating regimes.

In the example of FIG. 3, the method may include, at 330, activating ML-assistance functionality and provisioning, to the UE, a test sequence with the generated input test signals and corresponding reference output conditions. According to an embodiment, when ML-assistance activation is supported by the UE, the activating 330 may include transmitting an activation signal to the UE and waiting to receive feedback from the UE indicating its ML-assistance activation status. In some embodiments, the method may also include checking a validity of an output of the test sequence against a corresponding test reference output.

As described above, FIG. 3 is provided as one example. Other examples are possible according to some embodiments.

Figure 4:
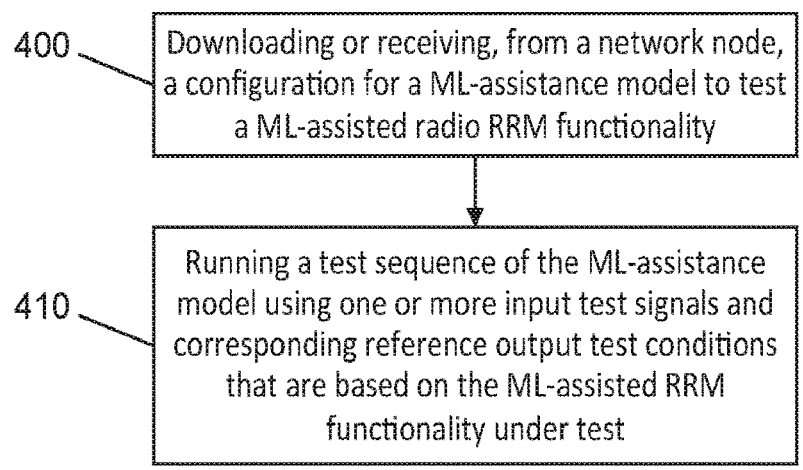
FIG. 4 illustrates an example flow diagram of a method, according to an embodiment.

FIG. 4 illustrates an example flow diagram of a method for testing UE ML-assisted RRM functionalities, according to one embodiment. In certain example embodiments, the flow diagram of FIG. 4 may be performed by a network entity or network node in a communications system, such as LTE or 5G NR. In some example embodiments, the network entity performing the method of FIG. 4 may include or be included in UE, communication node, mobile equipment (ME), mobile station, mobile device, stationary device, IoT device, or other device. In one embodiment, the method of FIG. 4 may be performed by a UE supporting or advertising ML-assistance capabilities. As such, some of the operations illustrated in FIG. 4 may be similar to some operations shown in, and described with respect to, FIG. 2.

As illustrated in the example of FIG. 4, the method may include, at 400, downloading or receiving, from a network node, a configuration for a ML-assistance model to test a ML-assisted radio RRM functionality. The method may also include, at 410, running a test sequence of the ML-assistance model using one or more input test signals and corresponding reference output test conditions that are based on the ML-assisted RRM functionality under test. In an embodiment, the input test signals and corresponding reference output conditions may be generated for each one of a plurality of different operating or testing regimes. According to one example, the reference output conditions may include KPIs.

In some embodiments, when the UE provides ML training and inference capability, the downloading 400 may include receiving at least one parameter for the ML-assistance model from the network node. In another embodiment, when the UE just provides ML inference capability, the downloading 400 may include receiving the full ML-assistance model from the network node. According to an embodiment, when the UE supports initialization status feedback, the method may include transmitting feedback, to the network node, indicating the UE's ML-assistance model initialization status. In an embodiment, the downloading 400 may further include receiving a list of test definitions comprising inputs and outputs to be used iteratively when running the test sequence.

According to some embodiments, the input test signals may include a signal time-trace sequence having pre-validated output RRM KPIs. In certain embodiments, the output test conditions may include one or more of: probability density functions of measured KPIs, event categorization, actions categorization, time-sequence of predicted KPIs, and/or output metrics combined with delay requirements for receiving feedback from the UE. According to an embodiment, when machine learning (ML)-assistance activation is supported by the UE, the method may include receiving an activation signal from the network node to trigger the running of the test sequence and transmitting feedback to the network node indicating the user equipment's ML-assistance activation status.

As described above, FIG. 4 is provided as one example. Other examples are possible according to some embodiments.

Figure 5A:
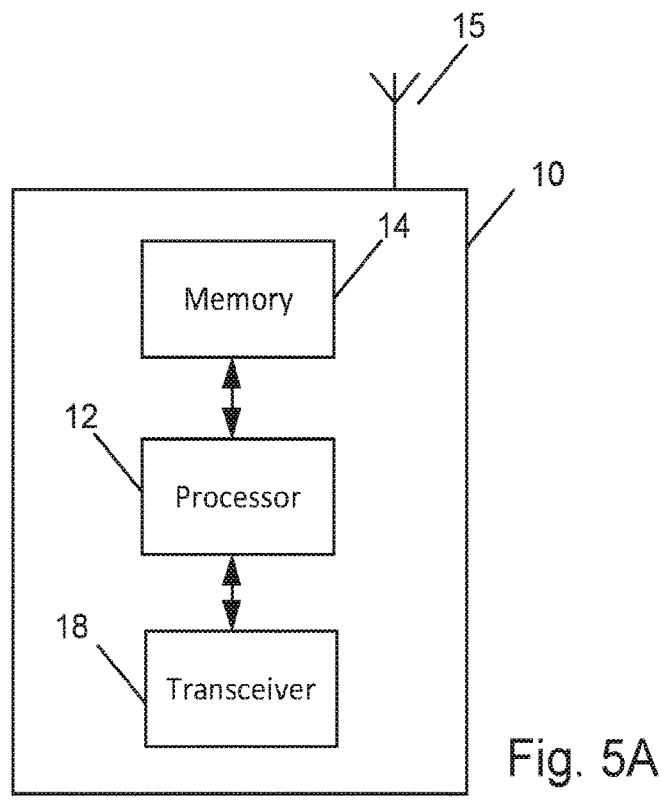
FIG. 5A illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 2 or FIG. 3, or any other method described herein. In some embodiments, as discussed herein, apparatus 10 may be configured to perform a procedure relating to testing UE ML-assisted RRM functionalities, for example.

Figure 5B:
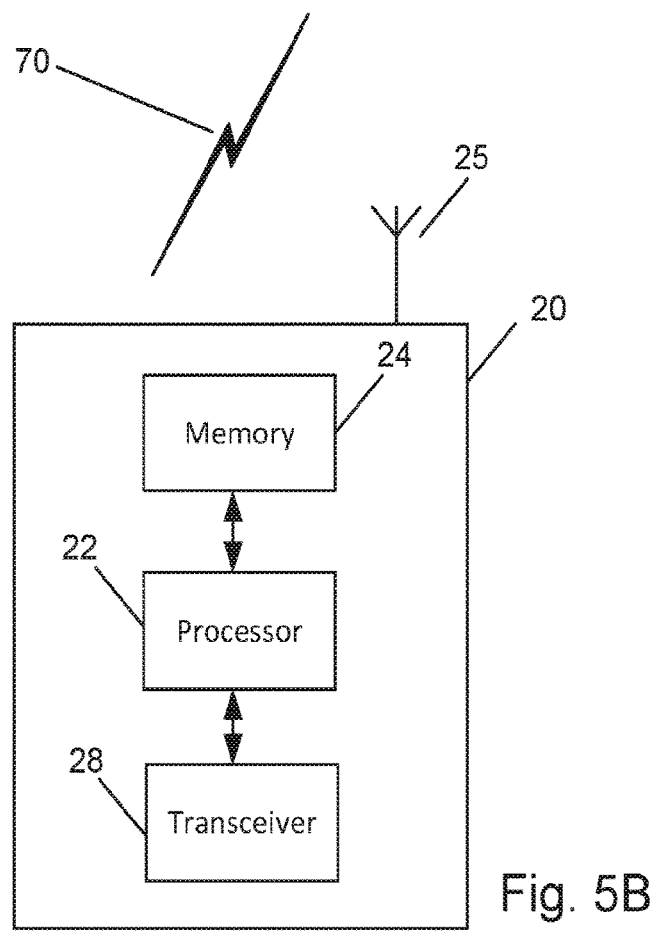
FIG. 5B illustrates an example block diagram of an apparatus, according to an embodiment.

FIG. 5B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 2 or FIG. 4, or any other method described herein. For example, in an embodiment, apparatus 20 may be controlled to perform a process relating to testing UE ML-assisted RRM functionalities.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, as discussed in detail above, certain embodiments provide scalability, flexibility, reduced configuration complexity when enabling ML-assistance in the UEs. Additionally, example embodiments allow for reliable and 'uniform' UE ML support in the UEs, so that any vendor specific solution cannot significantly impact negatively the network performance. Further, certain embodiments allow for implementation solutions where a UE may have some information that it does not want to expose, but still use in ML-assistance inference and/or training. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code are configured, with the at least one processor, to cause the apparatus at least to:
      select a radio resource management (RRM) functionality to be tested for a user equipment (UE) having advertised machine learning (ML)-assistance capabilities;
      initialize a ML-assistance model in the UE based on the advertised ML-assistance capabilities;
      generate one or more input test signals and corresponding reference output test conditions depending on the ML-assisted RRM functionality under test; and
      activate UE ML-assistance functionality and provisioning, to the UE, a test sequence with the generated one or more input test signals and corresponding reference output conditions.

2. The apparatus of claim 1, wherein the at least one memory and computer program code are configured, with the at least one processor, to cause the apparatus at least to repeat the generating of the one or more input test signals and corresponding reference output conditions for different operating regimes.

3. The apparatus of claim 2, wherein the operating regimes comprise at least one of stationary radio conditions or non-stationary radio conditions.

4. The apparatus of claim 1, wherein, when the UE has ML training and inference capability, the at least one memory and computer program code are configured, with the at least one processor, to cause the apparatus at least to provide, to the UE, at least one parameter for the ML-assistance model when the UE provides training and inference capabilities.

5. The apparatus of claim 1, wherein, when the UE has only ML inference capability, the at least one memory and computer program code are configured, with the at least one processor, to cause the apparatus at least to provide, to the UE, the full ML-assistance model.

6. The apparatus of claim 1, wherein, when the UE supports initialization status feedback, the at least one memory and computer program code are configured, with the at least one processor, to cause the apparatus at least to wait to receive feedback from the UE indicating its ML-assistance model initialization status.

7. The apparatus of claim 1, wherein the reference output conditions comprise key performance indicators.

8. The apparatus of claim 1, wherein the at least one memory and computer program code are configured, with the at least one processor, to cause the apparatus at least to provide a list of test definitions comprising inputs and outputs to be used iteratively when running the test sequence.

9. The apparatus of claim 1, wherein, to generate the input test signals, the at least one memory and computer program code are configured, with the at least one processor, to cause the apparatus at least to generate a signal time-trace sequence having pre-validated output RRM key performance indicators.

10. The apparatus of claim 1, wherein, to generate the output test conditions, the at least one memory and computer program code are configured, with the at least one processor, to cause the apparatus at least to generate at least one of:
    probability density functions of measured key performance indicators;
    event categorization;
    actions categorization;
    time-sequence of predicted key performance indicators; or
    output metrics combined with delay requirements for receiving feedback from the UE.

11. The apparatus of claim 1, wherein, when ML-assistance activation is supported by the UE, the at least one memory and computer program code are configured, with the at least one processor, to cause the apparatus at least to transmit an activation signal to the UE and wait to receive feedback from the UE indicating its ML-assistance activation status.

12. The apparatus of claim 1, wherein the at least one memory and computer program code are configured, with the at least one processor, to cause the apparatus at least to check a validity of an output of the test sequence against a corresponding test reference output.

13. The apparatus of claim 12, wherein the at least one memory and computer program code are configured, with the at least one processor, to cause the apparatus at least to:
    when the checking of the validity of the output fails, declare that the test sequence has failed; and
    when the checking of the validity of the output is confirmed, declare that the test sequence is passed.

14. An apparatus, comprising:
    at least one processor; and
    at least one memory comprising computer program code,
    the at least one memory and computer program code are configured, with the at least one processor, to cause the apparatus at least to:
       download, from a network node, a configuration for a machine learning (ML)-assistance model to test a ML-assisted radio resource management (RRM) functionality; and
       run a test sequence of the ML-assistance model using one or more input test signals and corresponding reference output test conditions that are based on the ML-assisted RRM functionality under test,
       wherein the input test signals and corresponding reference output conditions are generated for each one of different operating regimes, and
       wherein the operating regimes comprise at least one of stationary radio conditions or non-stationary radio conditions.

* * * * *